United States Patent
Kou et al.

(10) Patent No.: US 6,614,437 B1
(45) Date of Patent: Sep. 2, 2003

(54) APPARATUS AND METHOD FOR EFFICIENT MEMORY UTILIZATION IN AN ELECTRONIC SYSTEM

(75) Inventors: Chon In Kou, San Jose, CA (US); Tomonari Tohara, Foster City, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/236,822

(22) Filed: Jan. 25, 1999

(51) Int. Cl.[7] ............................................... G06F 13/14
(52) U.S. Cl. ........................ 345/520; 345/522; 345/537; 345/547
(58) Field of Search ................................ 345/501, 520, 345/522, 537, 543, 547

(56) References Cited

U.S. PATENT DOCUMENTS

| | | | |
|---|---|---|---|
| 4,858,173 A | * 8/1989 | Stewart et al. | 710/244 |
| 4,975,880 A | * 12/1990 | Knierim et al. | 365/189.02 |
| 5,428,766 A | * 6/1995 | Seaman | 709/215 |
| 5,489,746 A | * 2/1996 | Suzuki et al. | 84/602 |
| 5,493,589 A | * 2/1996 | Ibenthal | 375/371 |
| 5,568,200 A | * 10/1996 | Pearlstein et al. | 348/845.1 |
| 5,602,956 A | 2/1997 | Suzuki et al. | 386/68 |
| 5,745,791 A | * 4/1998 | Peek et al. | 710/52 |
| 5,818,533 A | 10/1998 | Auld et al. | 348/412 |
| 6,052,490 A | * 4/2000 | Haskell et al. | 382/268 |
| 6,141,744 A | * 10/2000 | Wing So | 712/35 |
| 6,275,877 B1 | * 8/2001 | Duda | 710/23 |

FOREIGN PATENT DOCUMENTS

| | | | |
|---|---|---|---|
| EP | 0696874 | 2/1996 | H04N/7/50 |
| EP | 0825781 | 2/1998 | H04N/7/50 |
| GB | 2316824 | 3/1998 | H04N/5/907 |
| WO | 9746023 | 12/1997 | H04N/7/50 |

* cited by examiner

*Primary Examiner*—Matthew C. Bella
*Assistant Examiner*—Mackly Monestime
(74) *Attorney, Agent, or Firm*—Gregory J. Koerner; Simon & Koerner LLP

(57) ABSTRACT

An apparatus and method for efficient memory utilization in an electronic system comprises a memory divided into memory units of equal size, a data source, and an interface between the memory and the data source, which manages storage and retrieval of data in the memory. The data source generates first data components and second data components, each of the first data components being larger than each of the second data components. Each memory unit is sized to contain one of the second data components.

The memory units are configured as a continuous memory ring. The interface stores the data components sequentially in the memory ring as the data components are generated by the data source. The interface also retrieves the data components sequentially from the memory ring. A control module sends control signals to the interface to control read and write operations for the data components.

18 Claims, 9 Drawing Sheets

APPARATUS AND METHOD FOR EFFICIENT MEMORY UTILIZATION IN AN ELECTRONIC SYSTEM

BACKGROUND OF THE INVENTION

1. Field of the Invention

This invention relates generally to data storage techniques, and relates more particularly to an apparatus and method for efficient memory utilization in an electronic system.

2. Description of the Background Art

Effective and efficient memory utilization is a significant consideration for designers, manufacturers, and users of electronic systems. Memory space for storage of data in electronic systems is often limited by physical constraints as well as by financial considerations. Many of the most effective and efficient electronic systems contain the smallest amount of memory necessary, and utilize that memory as efficiently as possible.

Such electronic systems vary widely, and may include digital video disc devices that reproduce feature films, video games, and other types of audio-visual entertainment, or set-top boxes for digital video broadcasting (DVB). Video data typically requires a large amount of digital data to encode the represented visual information. Such large amounts of digital data are typically compressed before being stored in a storage medium, such as a digital video disc (DVD). Video data may typically be encoded using various standard video compression techniques, for example JPEG or MPEG.

To display the video data stored on a DVD, the compressed digital data must be decoded. Video decoder systems perform a decoding process that depends on the compression technique used to compress the data. A decoding (or reconstruction) process typically reconstructs fields or frames of video from various pieces of data, including reference pictures, motion vectors, and error (or difference) coefficient data.

Video decoder systems typically utilize external system memory and blocks of internal memory to perform the reconstruction process. The various blocks of internal memory are typically assigned to store specific types of data. Efficient utilization of these specifically assigned blocks of internal memory improves the overall efficiency of the video decoder system. Manufacturers of such efficient systems will be able to produce a high quality product and provide it to consumers at a reasonable cost.

Video images are typically displayed at a high rate; for example thirty frames per second for interlaced scan images. Since reconstructing a single field or frame of video requires processing many pieces of data, a high display rate requires a correspondingly higher rate of data processing to create display images. The flow of data through internal memory must be managed as efficiently as possible to facilitate the high rate of data processing necessary in video decoder systems. Therefore, effective and efficient memory utilization remains a significant consideration for designers, manufacturers, and users of electronic systems.

SUMMARY OF THE INVENTION

In accordance with the present invention, an apparatus and method is disclosed for efficient memory utilization in an electronic system. The invention includes a memory divided into a plurality of equal-sized memory units, a data source, and an interface between the memory and the data source, which manages storage and retrieval of data in the memory. The data source generates a plurality of first data components and a plurality of second data components, each of the first data components containing more data than each of the second data components. Each memory unit is sized to contain one of the second data components.

In one embodiment of the present invention, the plurality of memory units is preferably configured as a continuous memory ring. The interface stores the data components sequentially in the memory ring as the data components are generated by the data source. Each type of data component does not have a specifically assigned location in the memory. The interface also retrieves the data components sequentially from the memory ring. A control module sends control signals to the interface to control read and write operations for the data components.

The control module also asserts a busy signal to the data source to halt generation of the data components when sufficient memory is not available. The control module de-asserts the busy signal to resume generation of the data components by the data source when sufficient memory becomes available.

In one embodiment, the electronic system comprises a video decoder system. The first data components comprise luminance data, and the second data components comprise chrominance data. The data source alternately generates luminance data components and chrominance data components, and each luminance data component contains twice as much data as each chrominance data component. The interface stores each luminance data component in two memory units and stores each chrominance data component in one memory unit.

In one embodiment, the interface monitors the location of each data component in the memory, and generates a write enable and a read enable in response to control signals from the control module. The interface also generates addresses for the data components in response to a control signal from the control module. The present invention thus efficiently and effectively implements efficient memory utilization in an electronic system.

DETAILED DESCRIPTION OF THE PREFERRED EMBODIMENT

The present invention relates to an improvement in data storage techniques. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a memory divided into a plurality of equal-sized memory units, a data source, and an interface between the memory and the data source, which manages storage and retrieval of data in the memory. The data source generates a plurality of first data components and a plurality of second data components, each of the first data components containing more data than each of the second data components. Each memory unit is sized to contain one of the second data components.

The plurality of memory units is configured as a continuous memory ring. The interface stores the data components sequentially in the memory ring as the data components are generated by the data source. The interface also retrieves the data components sequentially from the memory ring. A control module sends control signals to the interface to control read and write operations for the data components.

Figure 1:
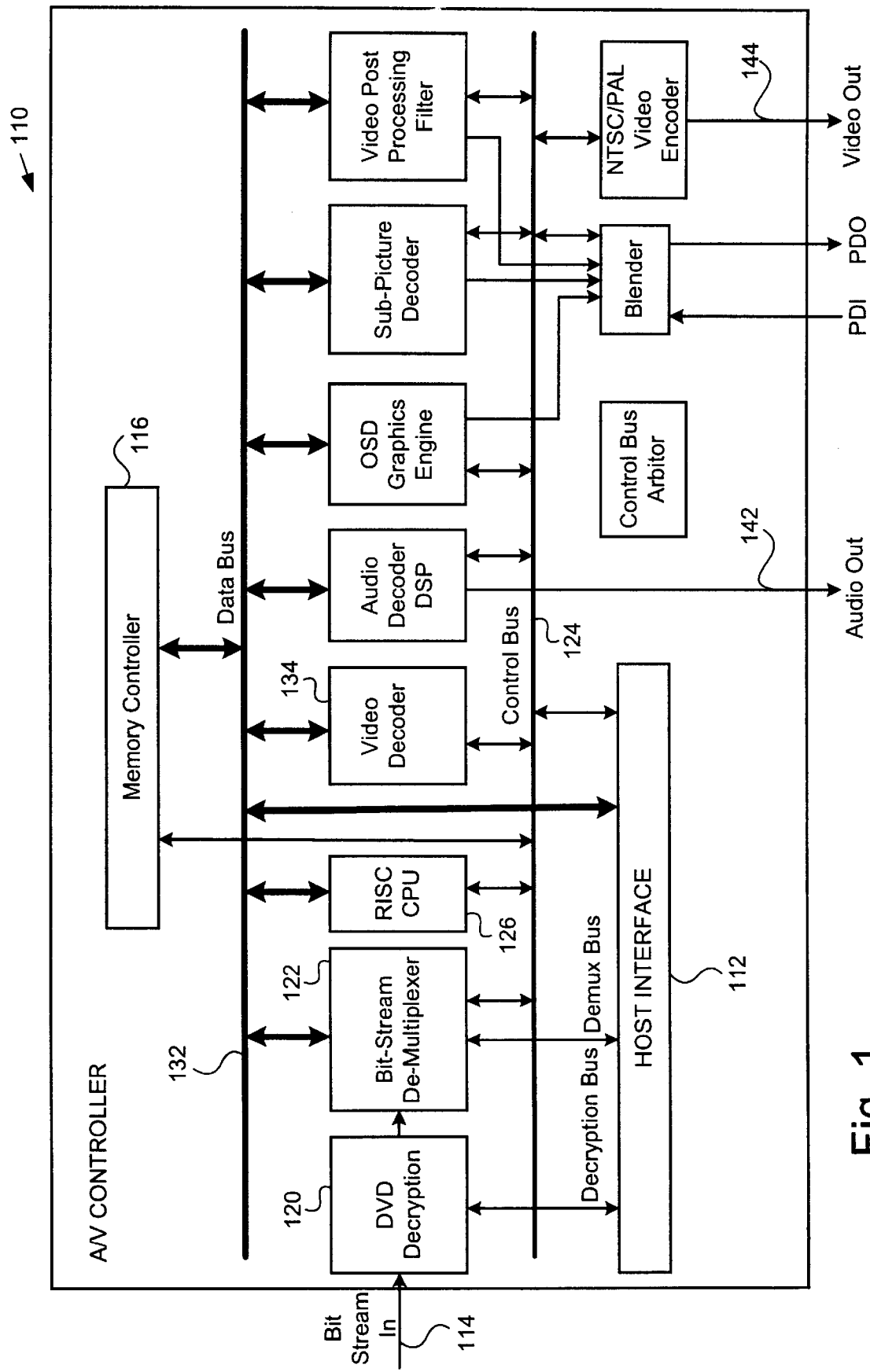
FIG. 1 is a block diagram for one embodiment of an audio-video (A/V) controller, according to the present invention.

Referring now to FIG. 1, a block diagram for one embodiment of an audio-video (A/V) controller 110 is shown, according to the present invention. In the FIG. 1 embodiment, A/V controller 110 includes, but is not limited to, a host interface 112, a memory controller 116, a DVD decryption module 120, a bit-stream demultiplexer 122, a RISC CPU 126, a video decoder 134, a control bus 124, and a data bus 132.

In operation, A/V controller 110 of FIG. 1 receives source data (bitstream in) from a program source (not shown) via line 114. A/V controller 110 responsively processes and decodes the source data to produce six channels of audio (audio out) on line 142. A/V controller 110 also processes and decodes the source data to produce six channels of video (video out) on line 144. A/V controller 110 then preferably provides the audio out signals and the video out signals to a playback system (not shown) for playback reproduction. Although the present invention is described in the context of an A/V controller, other embodiments of electronic systems are within the scope of the present invention.

Figure 2:
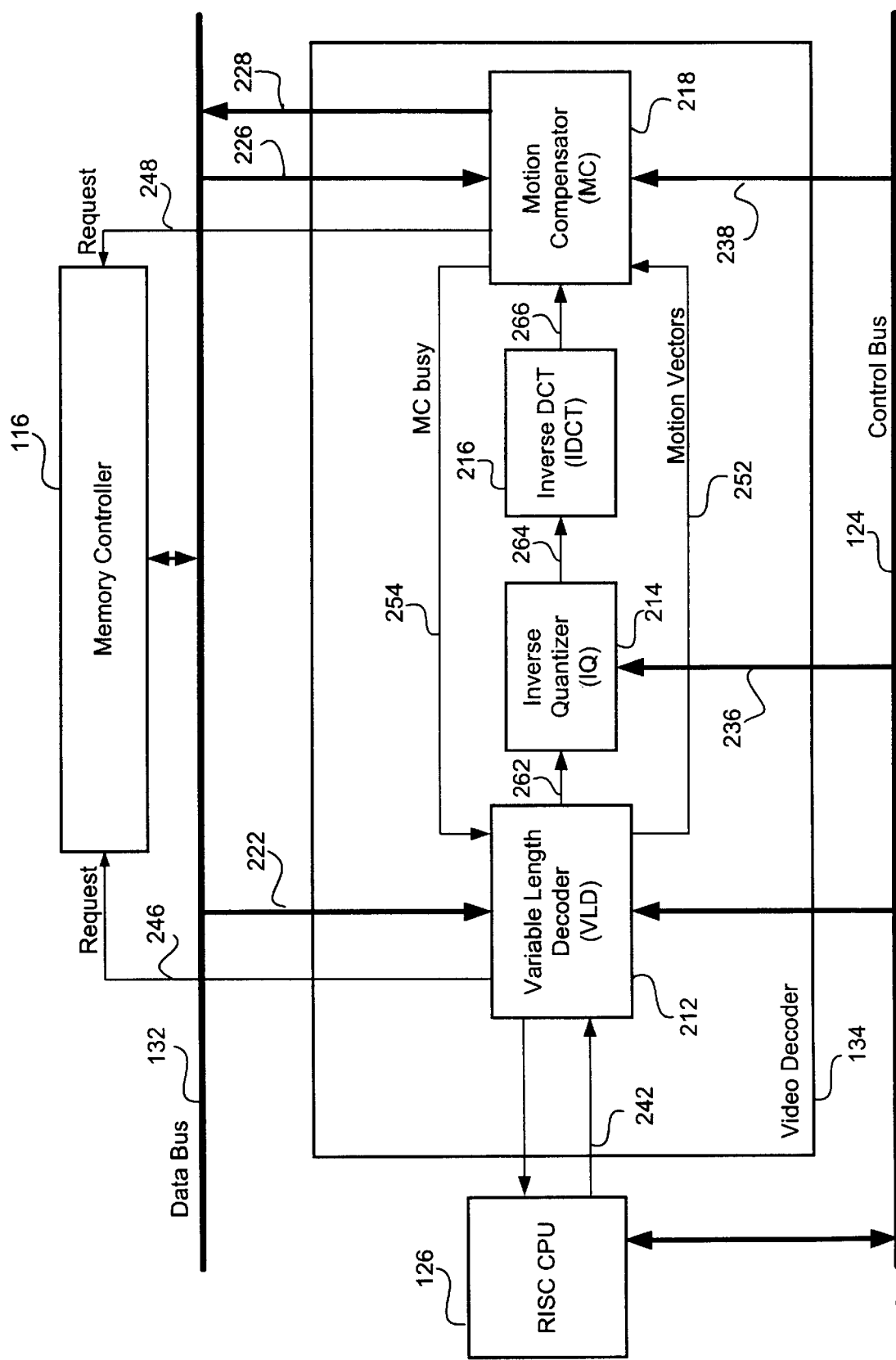
FIG. 2 is a block diagram for one embodiment of the video decoder of FIG. 1, according to the present invention.

Referring now to FIG. 2, a block diagram for one embodiment of the FIG. 1 video decoder 134 is shown, according to the present invention. In the FIG. 2 embodiment, video decoder 134 receives compressed video data and decoding instructions from an external system memory (not shown) via data bus 132 and control bus 124. The compressed video data typically has been encoded using MPEG standard video compression techniques. In MPEG standard video compression, each video picture is typically divided into units called blocks. Each block preferably contains sixty-four pixels, arranged in an eight-by-eight pixel square. Another unit of video data is referred to as a macroblock, which comprises four blocks.

MPEG video compression is used to compress moving pictures. Motion video contains a series of still video pictures, and adjacent pictures are typically very similar. MPEG compression encodes some video pictures as reference pictures, in which the entire picture is compressed. Reference pictures are compressed by performing a discrete cosine transform on the video data. The transformed data is then quantized using a quantization table. The quantized data is then compressed using run-length compression.

Other video pictures are encoded as reconstructed pictures. Instead of encoding the entire picture, reconstructed pictures are encoded as motion vectors and error coefficient data. A reference picture is divided into macroblocks. Motion vectors indicate how each reference picture macroblock moved between the reference picture and the reconstructed picture. Error coefficient data indicate the changes, if any, in the content of each macroblock between the reference picture and the reconstructed picture. Error coefficient data for reconstructed pictures is compressed in the same way as video data for reference pictures.

In the FIG. 2 embodiment, video decoder 134 includes, but is not limited to, a variable length decoder (VLD) 212, an inverse quantizer (IQ) 214, an inverse discrete cosine transformer (IDCT) 216, and a motion compensator (MC) 218. VLD 212, IQ 214 and IDCT 216 comprise a video pipeline, or data source, that processes video data in units of blocks. MC 218, however, preferably processes video data in units of macroblocks.

In response to a request 246 provided to memory controller 116, VLD 212 receives compressed video data from external system memory (not shown) via data bus 132 and line 222. VLD 212 partially decodes the compressed video data following instructions provided by RISC CPU 126 via line 242. VLD 212 decodes motion vectors and encoded error coefficient data. Motion vectors indicate a change in position, if any, of a macroblock of video data from a reference picture to a reconstructed picture. VLD 212 sends motion vectors to MC 218 via line 252.

Error coefficient data indicates the difference, or error, between two adjacent video pictures. The error coefficient data identified by VLD 212 contains blocks of luminance (luma, or Y) data and blocks of chrominance (chroma, or C) data. Luma and chroma data represent intensity and color, respectively. In one embodiment, each macroblock of video has a first component of error coefficient data and a second component of error coefficient data. The first data component preferably comprises four blocks of luma data and the second data component preferably comprises two blocks of chroma data.

VLD 212 sends blocks of encoded error coefficient data to IQ 214 via line 262. IQ 214 then dequantizes each encoded block of error coefficient data using a quantization table fetched from external memory via control bus 124 and line 236. IQ 214 next sends the resulting blocks of partially decoded error coefficient data to IDCT 216 via line 264. IDCT 216 preferably performs an inverse discrete cosine transform to produce blocks of error coefficient data. IDCT 216 then sends the decoded blocks of error coefficient data to MC 218 via line 266.

MC 218 responsively reconstructs macroblocks of video images. MC 218 fetches reference macroblocks from external memory, adjusts the content of the reference macroblocks according to the error coefficient data, and adjusts the position of the reference macroblocks in the field or frame of video according to the motion vectors to construct a reconstructed macroblock. MC 218 then sends the reconstructed macroblocks of video to external memory (not shown) via data bus 132 for storage prior to being displayed. MC 218 is further discussed below in conjunction with FIG. 3.

Figure 3:
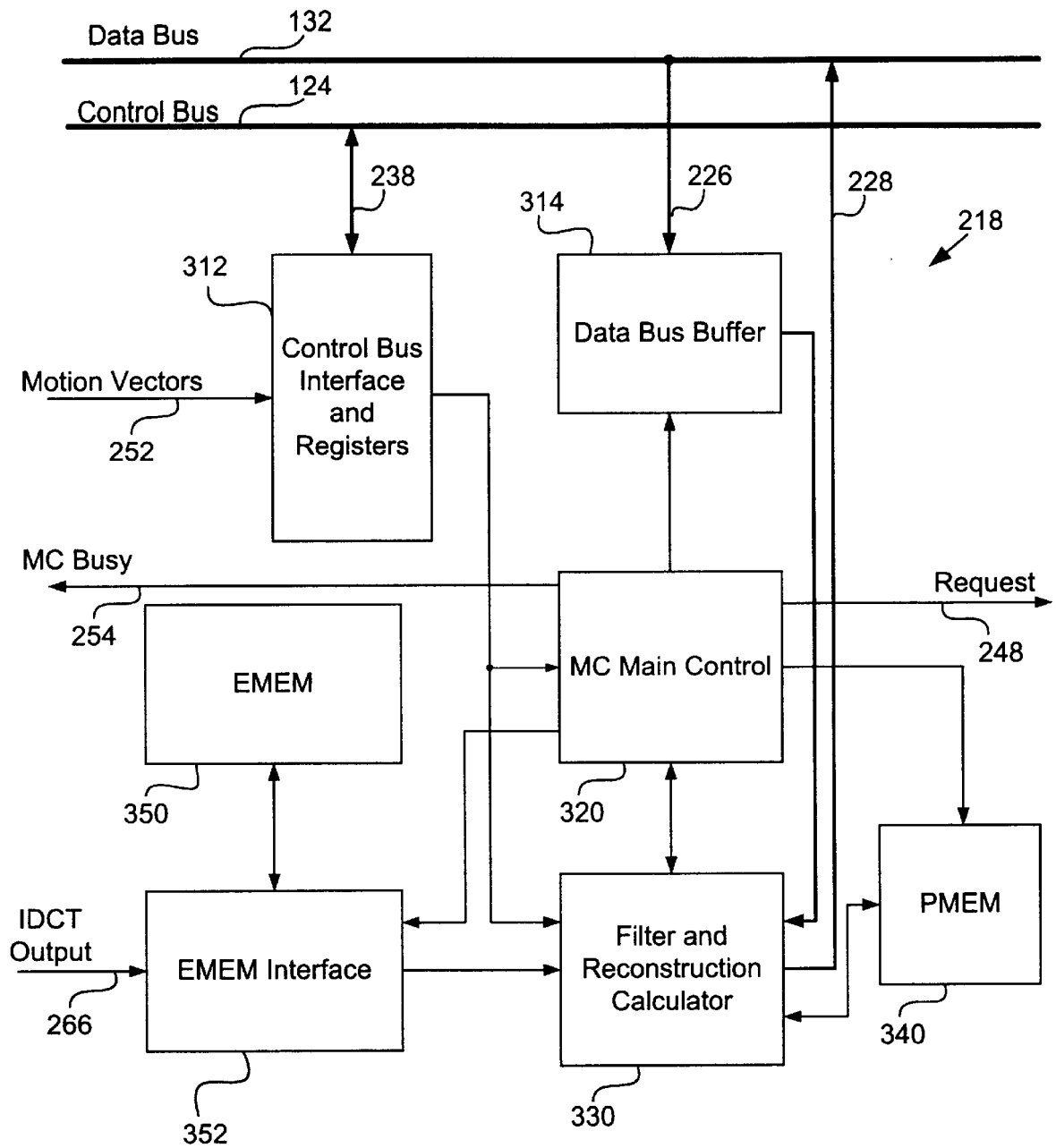
FIG. 3 is a block diagram for one embodiment of the motion compensator (MC) of FIG. 2, according to the present invention.

Referring now to FIG. 3, a block diagram for one embodiment of the FIG. 2 motion compensator (MC) 218 is shown, according to the present invention. MC 218 includes, but is not limited to, a control bus interface and registers 312, a data bus buffer 314, a MC main control 320, a filter and reconstruction calculator 330, a PMEM memory 340, an EMEM memory 350, and an EMEM interface 352.

Reference macroblocks arrive via data bus 132 and line 226 to data bus buffer 314 in response to a request 248 to memory controller 116 (FIG. 1). Data bus buffer 314 sends the reference macroblocks to calculator 330 for filtering. The filtered reference macroblocks are then stored in PMEM 340.

Motion vectors from VLD 212 arrive via line 252 to registers 312. The output of IDCT 216, the error coefficient data, is received by EMEM interface 352 via line 266, and stored in EMEM 350. The arriving error coefficient data alternates between luma and chroma data components. In one video compression technique, each luma (Y) component contains four blocks of luma data, and each chroma (C) component contains two blocks of chroma data. Thus, each luma (Y) component is twice as large as each chroma (C) component.

To reconstruct a macroblock of video data, motion vectors from registers 312 are sent to calculator 330. Calculator 330 uses the motion vectors to determine memory addresses for appropriate reference macroblocks stored in external system memory. MC main control 320, the control module, sends a request 248 to memory controller 116 to fetch the reference macroblocks. The reference macroblocks arrive via data bus 132 to data bus buffer 314, and are sent to calculator 330 for filtering. The filtered reference macroblocks are then stored in PMEM 340.

MC main control 320 sends filtered reference macroblocks from PMEM 340 and error coefficient data from EMEM 350 to calculator 330. Calculator 330 responsively adjusts the content of each filtered reference macroblock according to its corresponding error coefficient data, and adjusts the position of each macroblock in a field or frame of video according to its corresponding motion vectors. MC main control 320 then sends the reconstructed macroblocks to external memory via line 228 and data bus 132.

Error coefficient data from IDCT 216 arrives at EMEM interface 352 and EMEM 350 as the data is generated, and not in response to a request from MC 218. EMEM 350 may, at times, be unable to accept more data. To stop the flow of error coefficient data, MC main control 320 asserts an MC busy signal to VLD 212 along line 254. The MC busy signal must be asserted before EMEM 350 is full, because VLD 212 is three block-sized data buffers away from MC 218. IQ 214 and IDCT 216 will continue to process blocks of error coefficient data after MC busy is asserted. Three blocks of error coefficient data will thus arrive at EMEM interface 352 and be written to EMEM 350 after MC busy has been asserted.

Figure 4:
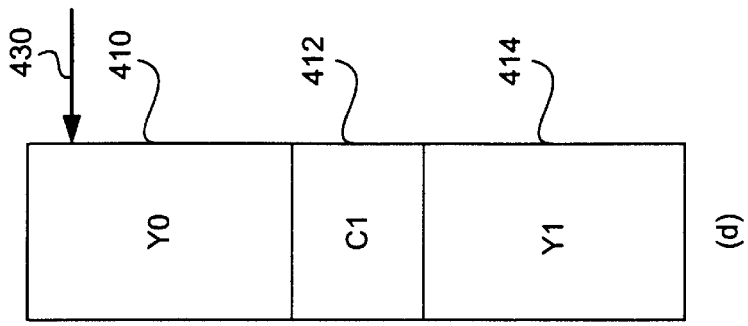
FIG. 4 is a diagram for one embodiment of the EMEM memory of FIG. 3.
Figure 4:
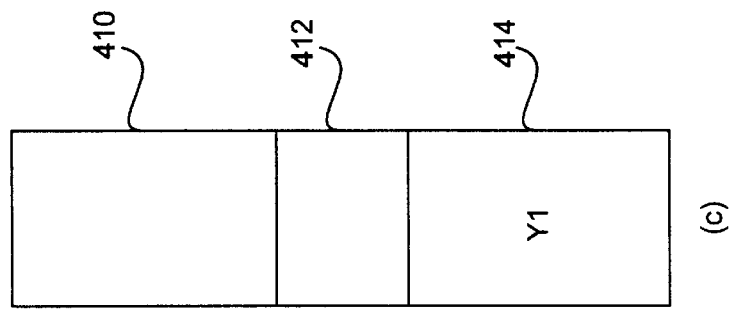
Figure 4:
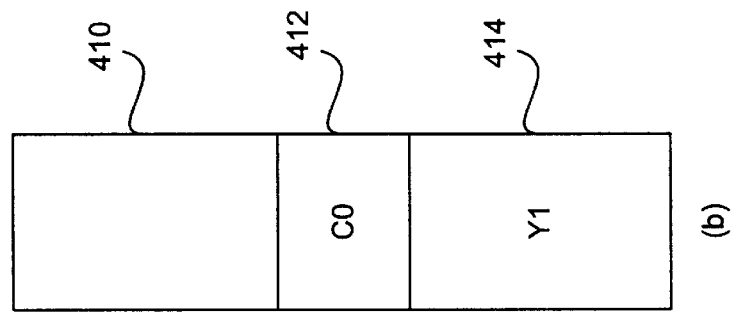
Figure 4:
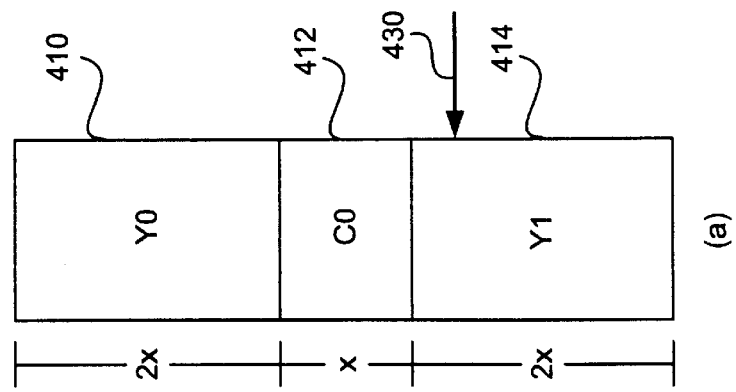

Referring now to FIG. 4, a diagram for one embodiment of the EMEM memory 350 of FIG. 3 is shown. The amount of internal memory available for EMEM 350 is typically limited, and preferably comprises only as much memory as necessary. Memory in electronic systems is generally expensive, in terms of physical space as well as cost. Efficient utilization of the limited amount of memory available for EMEM 350 contributes to the overall efficiency of video decoder 134 and A/V controller 110.

In the FIG. 4 embodiment, EMEM 350 holds two luma components and one chroma component when full. Memory units 410 and 414 are specifically assigned to store luma data, and are two times larger than memory unit 412, which is specifically assigned to store chroma data. The alternating error coefficient data components from IDCT 216 may be represented as a repeating pattern of four types of data components, Y0, C0, Y1, C1, although each data component contains different data. Since the FIG. 4 embodiment of EMEM 350 has the capacity to store only two different luma components at one time, MC main control 320 differentiates between two different luma components, Y0 and Y1. MC main control 320 also differentiates between two different chroma components, C0 and C1.

As error coefficient data arrives from IDCT 216, memory units 410, 412, and 414 are filled with Y0, C0, and Y1 respectively, as shown in FIG. 4(a). As described above in conjunction with FIG. 3, MC busy must be asserted to VLD 212 before EMEM 350 becomes full. Thus, in FIG. 4(a), MC busy should be asserted when write pointer 430 is at the top of memory unit 414.

In FIG. 4(b), the Y0 component in memory unit 410 has been read, and memory unit 410 is able to accept more data. However, since the next arriving data component is C1 (chroma data), memory unit 410 cannot be filled because memory unit 410 is assigned to accept only luma data. Thus, VLD 212 will not resume processing error coefficient data until memory unit 412 has been read, as shown in FIG. 4(c). The next chroma component will be written to memory unit 412, and the next luma component, Y0, will then be written to memory unit 410, as shown in FIG. 4(d). MC busy must be asserted when write pointer 430 is at the top of memory unit 410, because storing the incoming Y0 component will result in EMEM 350 being full.

In the situation shown in FIG. 4(b), MC 218 will not resume writing data to EMEM 350 even though memory unit 410 is empty. The flow of data from IDCT 216 must remain idle until memory unit 412 is available to receive the next chroma component. Thus the FIG. 4 configuration is not a highly efficient utilization of the limited amount of internal memory allocated for EMEM 350.

The FIG. 4 configuration of EMEM 350 also requires that MC busy be asserted frequently, whereby VLD 212 stops processing error coefficient data. Frequently halting the processing of data by VLD 212 significantly reduces the overall efficiency of video decoder 134.

Figure 5:
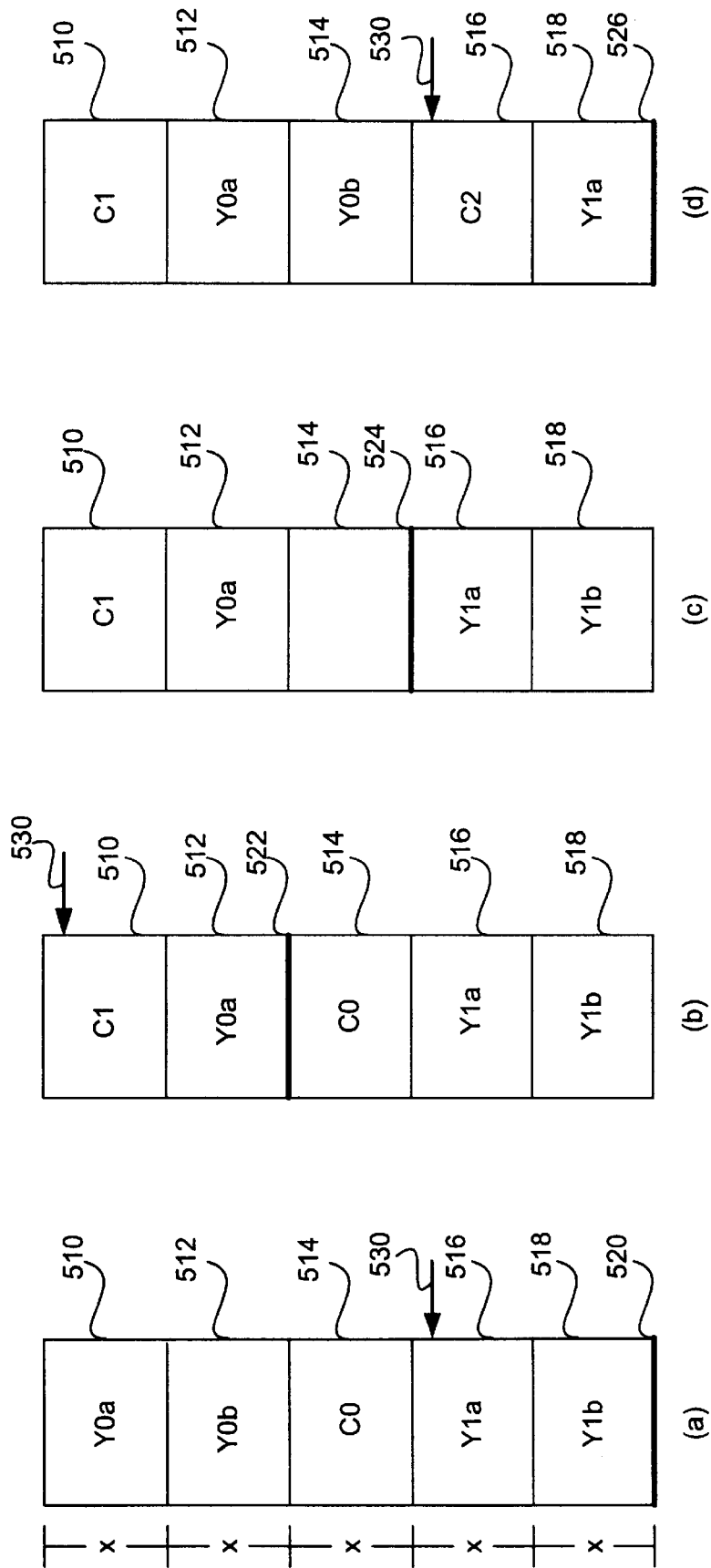
FIG. 5 is a diagram for one embodiment of the EMEM memory of FIG. 3, according to the present invention.

Referring now to FIG. 5, a diagram for one embodiment of the FIG. 3 EMEM memory 350 is shown, according to the present invention. The FIG. 5 embodiment of EMEM 350 requires the same amount of storage capacity as the FIG. 4 embodiment, but is divided into five memory units of equal size. In the FIG. 5 embodiment, luma components and chroma components are advantageously not assigned to specific locations within EMEM 350.

Each memory unit in the FIG. 5 embodiment is sized to contain two blocks of video data. Each memory unit is thus able to hold one chroma component. In the FIG. 5 embodiment, each luma component is twice the size of each chroma component; therefore each luma component may be divided equally between two memory units. Since the FIG. 5 embodiment of EMEM 350 has the capacity to store two different luma components at one time, MC main control 320 differentiates between two different luma components, Y0 and Y1. The FIG. 5 embodiment of EMEM 350 holds two chroma components at one time, so MC main control 320, also differentiates between two different chroma data components, C0 and C1.

The FIG. 5 embodiment of EMEM 350 is configured as a continuous memory ring. As error data from IDCT 216 arrives, memory units 510 through 518 are sequentially filled with Y0, C0, and Y1 components, as shown in FIG. 5(*a*). The first half of the Y0 component, Y0*a*, is stored in memory unit 510, and the second half of the Y0 component, Y0*b*, is stored in memory unit 512. The next data component is chroma component C0, which is stored in memory unit 514. The first half of the next luma component, Y1*a*, is stored in memory unit 516, and the second half of the Y1 component, Y1*b*, is stored in memory unit 518. The logical end 520 of EMEM 350 is at the end of memory unit 518.

As described above in conjunction with FIG. 3, MC busy should be asserted to VLD 212 before EMEM 350 becomes full to avoid writing over data that has yet to be read. Since VLD 212 is three block-sized data buffers away from EMEM 350, MC busy should be asserted when there remains enough empty memory space for three blocks of data. Each memory unit in the FIG. 5 embodiment holds two blocks of data, so in FIG. 5(*a*) MC busy is asserted when the write pointer 530 is at the top of memory unit 516.

In FIG. 5(*b*), the Y0 component has been read, freeing memory units 510 and 512 and moving the logical end 522 of EMEM 350 to the end of memory unit 512. The next error coefficient data, C1, may now be written to memory unit 510, and the first half of the next luma component, Y0*a*, may be written to memory unit 512. The MC busy signal is asserted when the write pointer 530 is at the top of memory unit 510.

In contrast to the FIG. 4 embodiment, the C1 component may be written to the FIG. 5 embodiment of EMEM 350 as soon as memory unit 510 becomes available, instead of waiting until the C0 component has been read. VLD 212 will be idle for a shorter period of time, thereby increasing the efficiency of video decoder 134.

In FIG. 5(*c*), the C0 component has been read, freeing memory unit 514 and moving the logical end 524 of EMEM 350 to the end of memory unit 514. Although there is memory space available, the next data component will not be written to EMEM 350 until there are at least two memory units available. If MC busy is asserted as soon as data begins to be written to memory unit 514, error coefficient data will not stop coming from IDCT 216 until memory unit 516 has been overwritten. Thus, MC busy will not be de-asserted until there are at least two memory units available to receive data.

In FIG. 5(*d*), the Y1 component has been read, freeing up memory units 516 and 518 and moving the logical end 526 of EMEM 350 to the end of memory unit 518. Since there are now three memory units available, MC busy is de-asserted and the write operation proceeds. The second half of the next Y0 component, Y0*b*, is written to memory unit 514, the next C0 component is written to memory unit 516, and the first half of the next Y1 component, Y1*a*, is written to memory unit 518. MC busy is asserted when the write pointer 530 is at the top of memory unit 516, so that data will stop coming from IDCT 216 after the first half of the next Y1 component, Y1*a*, is written to memory unit 518.

The FIG. 5 embodiment of EMEM 350 requires the assertion of MC busy less often and for shorter periods of time than the FIG. 4 embodiment. Thus the flow of data from VLD 212 is interrupted less frequently, thereby increasing the efficiency of video decoder 134. The FIG. 5 embodiment of EMEM 350 achieves greater efficiency than the FIG. 4 embodiment without increasing the amount of memory.

Figure 6:
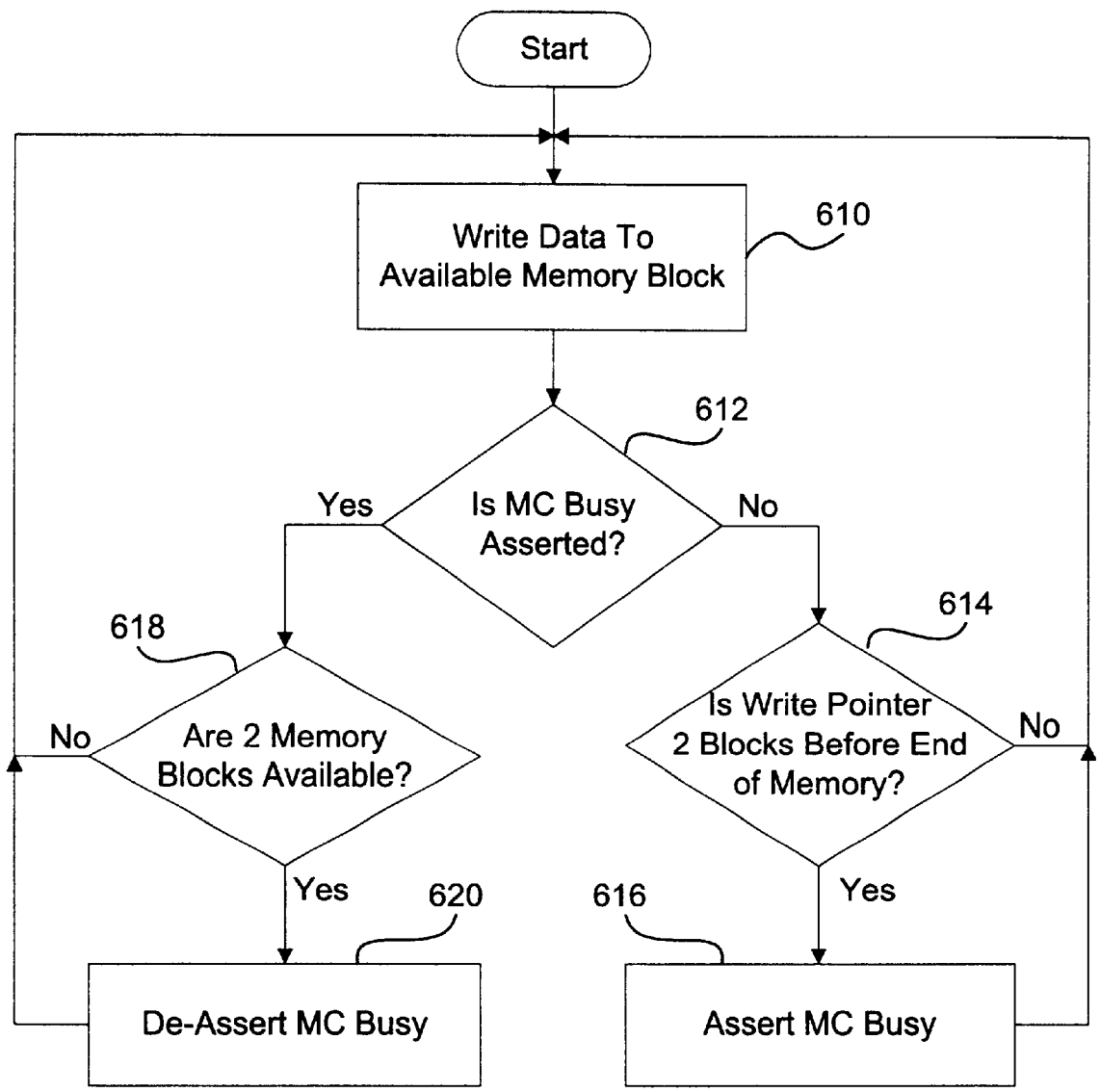
FIG. 6 is a flowchart of method steps for managing data flow into the EMEM memory of FIG. 5, according to one embodiment of the present invention.

Referring now to FIG. 6, a flowchart of method steps for managing data flow into a memory is shown, according to one embodiment of the present invention. The method steps of FIG. 6 are preferably performed using the FIG. 5 embodiment of EMEM 350. Initially, in step 610, EMEM interface 352 writes data to the next available memory unit, as described below in conjunction with FIG. 7. In step 612, MC main control 320 determines whether the MC busy signal is asserted. If MC busy is not asserted, then the FIG. 6 method proceeds to step 614. However, if MC busy is asserted, then the FIG. 6 method proceeds to step 618.

In step 614, MC main control 320 determines whether the write pointer 530 is two memory units before the logical end of EMEM 350. If the write pointer 530 is two memory units before the logical end of EMEM 350, then, in step 616, MC main control 320 asserts MC busy to VLD 212 to halt the flow of error coefficient data. The FIG. 6 method then returns to step 610 to continue writing error coefficient data coming from IDCT 216 to EMEM 350.

Alternately, in step 618, MC main control 320 determines whether there are at least two memory units available for incoming error coefficient data. If at least two memory units are not available, then the FIG. 6 method returns to step 610, where EMEM interface 352 continues to write any incoming error coefficient data to available memory. If at least two memory units are available, then MC main control 320 de-asserts MC busy to restart the transfer of error coefficient data from VLD 212, and the FIG. 6 method returns to step 610, although there may be some delay before IDCT 216 outputs data to EMEM interface 352.

Figure 7:
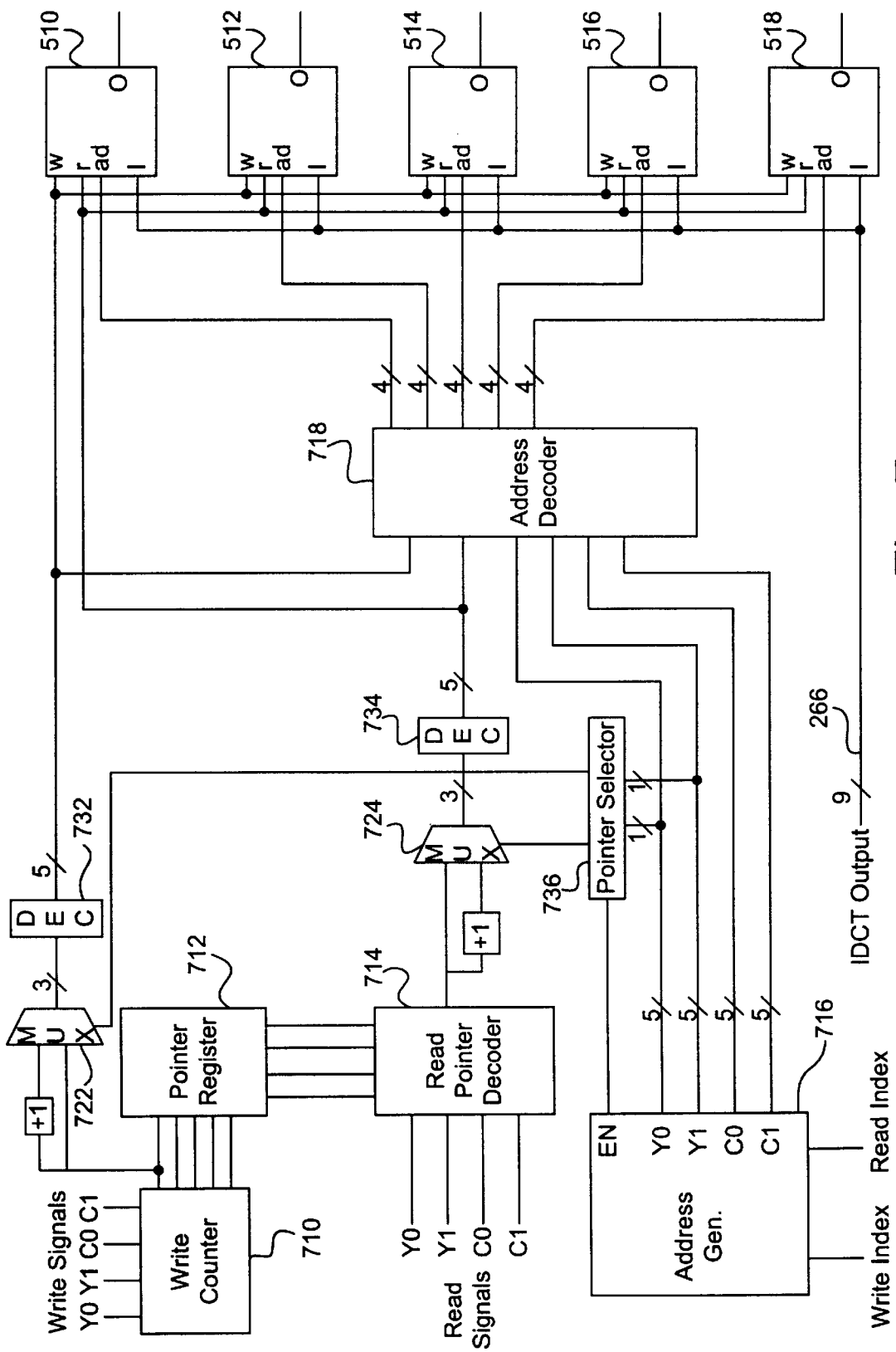
FIG. 7 is a block diagram for one embodiment of the EMEM interface and EMEM memory of FIG. 3, according to the present invention.

Referring now to FIG. 7, a block diagram for the EMEM interface 352 and EMEM 350 of FIG. 3 is shown, according to one embodiment of the present invention. FIG. 7 includes the embodiment of EMEM 350 described above in conjunction with FIG. 5. In the FIG. 7 embodiment, EMEM interface 352 manages the flow of data to and from EMEM 350 by effectively monitoring the location of each data component. EMEM interface 352 preferably receives various control signals from MC main control 320 to control the reading and writing of data to EMEM 350. EMEM interface 352 responsively decodes the control signals to write incoming error coefficient data to available memory units in EMEM 350, and also to read data from the appropriate memory units of EMEM 350. The FIG. 7 EMEM interface 352 includes, but is not limited to, a write counter 710, a pointer register 712, a read pointer decoder 714, an address generator 716, and an address decoder 718.

In the FIG. 7 embodiment, write counter 710 counts from zero to four because EMEM 350 is divided into five memory units 510–518. Write counter 710 preferably receives write signals from MC main control 320 to indicate which type of data component will be coming from IDCT 216. As described above in conjunction with FIG. 3, the data from IDCT 216 alternates between luma (Y) components and chroma (C) components. The write signals from MC main control 320 will indicate the order of incoming data as Y0, C0, Y1, C1 in a repeating pattern, although each data component contains different data. MC main control 320 and EMEM interface 352 differentiate between two different luma components because EMEM 350 will contain no more than two luma components at one time. MC main control 320 and EMEM interface 352 also differentiate between two different chroma components because EMEM 350 will contain no more than two chroma components at one time.

When a write signal is received from MC main control 320, write counter 710 then increments the counter value. If the incoming data is a luma component, the value is incremented by one. The value is incremented by one because the previous data component from IDCT 216 was a chroma component that was written to one memory unit. If the incoming data is a chroma component, the value is incremented by two. The value is incremented by two because the previous data component from IDCT 216 was a luma component that was written to two memory units. Pointer register 712 stores the current counter value and the type of data component arriving from IDCT 216. The counter value and the counter value incremented by 1 are input to a multiplexer 722. Multiplexer 722 outputs one of the values as the write pointer according to a select value, to be discussed below. Decoder 732 decodes the write pointer to produce a write enable. The write enable enables one of the memory units in EMEM 350 to store the data component arriving from IDCT 216 via line 266.

Read pointer decoder 714 receives a read signal from MC main control 320 indicating which data component is to be read from EMEM 350. Read pointer decoder 714 retrieves the counter value (stored in pointer register 712) that corresponds to the data component to be read. Multiplexer 724 outputs a read pointer as the counter value or the counter value incremented by 1, according to a select value, to be described below. Decoder 734 decodes the read pointer to produce a read enable. The read enable enables the appropriate memory unit to be read by calculator 330 (FIG. 3).

In the FIG. 7 embodiment, address generator 716 receives a write index or read index signal from MC main control 320 to indicate that a data component is being stored or retrieved. Address generator 716 responsively generates five-bit addresses for the indicated data component. Address generator 716 will generate 32 addresses for each luma component and 16 addresses for each chroma component. The addresses from address generator 716 are input to address decoder 718. Address decoder 718 also receives the read enable and the write enable as inputs. Address decoder 718 responsively outputs four-bit memory addresses for each enabled memory unit. Data may then be written to and read from different memory units at the same time.

Address generator 716 also generates an enable signal for a pointer selector 736. Pointer selector 736 receives as inputs the most significant bit (MSB) of the five-bit addresses generated for Y0 and Y1 data components. Pointer selector 736 will output the MSB to either multiplexer 722 or multiplexer 724 as indicated by the enable signal from address generator 716. Pointer selector 736 thus manages the division of luma components between two adjacent memory units.

For example, a Y1 component may be written to memory units 518 and 510. The first half of the 32 addresses for the Y1 component will have a MSB of zero, and the second half of the addresses will have a MSB of one. The MSB of the Y1 addresses is input to pointer selector 736. Pointer selector 736 sends the value of the MSB to multiplexer 722 as the select value. When the MSB of Y1 is zero, multiplexer 722 selects the current counter value (4 for memory unit 518) as the write pointer. When the MSB of the Y1 addresses is one, multiplexer 722 selects the current counter value incremented by one (0 for memory unit 510) as the write pointer. When a luma component is to be read, pointer selector 736 generates a select value for multiplexer 724 in the same manner to select the appropriate value for the read pointer. In this way the FIG. 7 embodiment of EMEM interface 352 efficiently manages data flow in EMEM 350.

Figure 8:
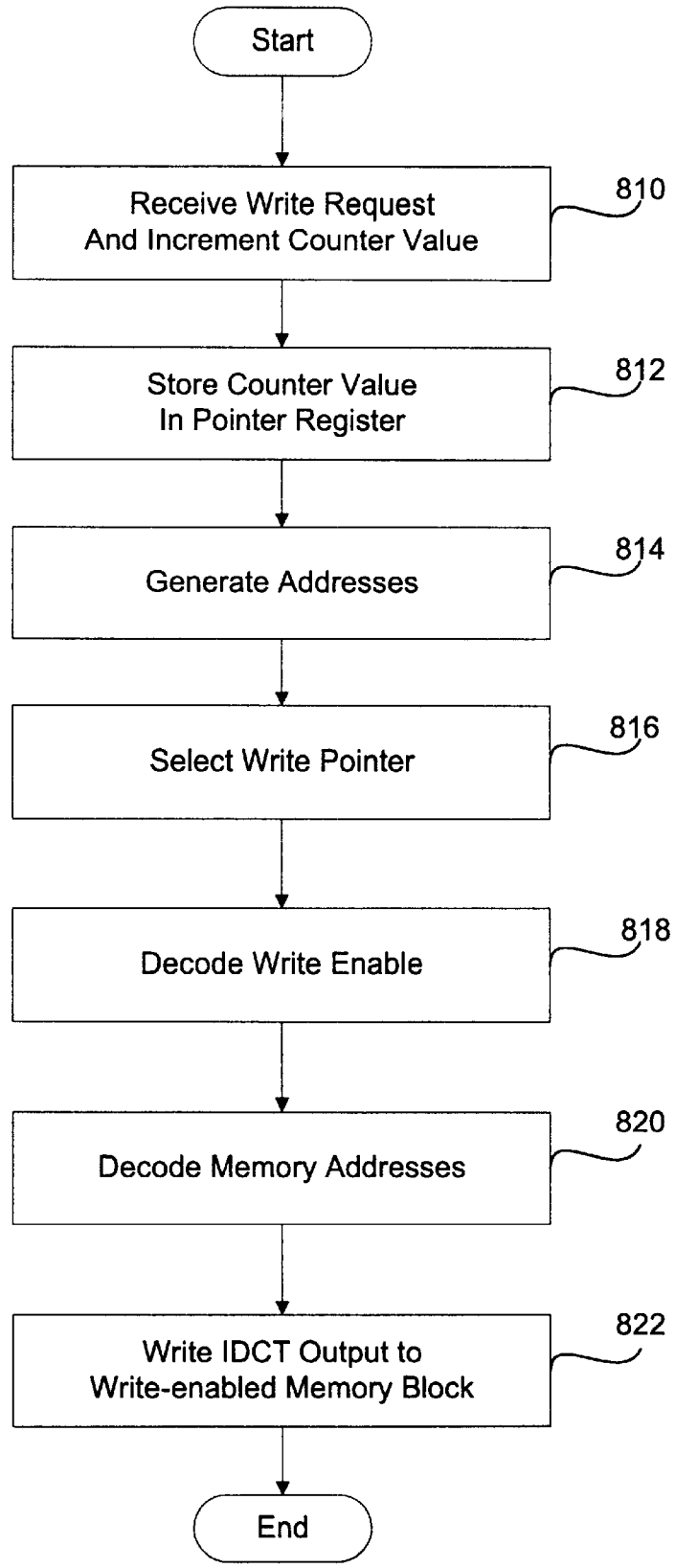
FIG. 8 is a flowchart of method steps for writing data to a memory unit, according to one embodiment of the present invention.

Referring now to FIG. 8, a flowchart of method steps for writing data to a memory unit is shown, according to one embodiment of the present invention. The method steps of FIG. 8 are preferably performed using the embodiment of EMEM 350 and EMEM interface 352 described above in conjunction with FIG. 7. Initially, in step 810, write counter 710 receives a write signal from MC main control 320 and increments a counter value. If the incoming data is a luma component, then the counter value is incremented by one, and if the incoming data is a chroma component, the counter value is incremented by two. In step 812, pointer register 712 stores the counter value and the type of incoming data.

In step 814, address generator 716 receives a write index signal from MC main control 320 and responsively generates addresses for the incoming data. In step 816, multiplexer 722 outputs the appropriate counter value as a write pointer, according to a select value from pointer selector 736. In step 818, decoder 732 decodes a write enable to enable the appropriate memory unit in EMEM 350. In step 820, address decoder 718 decodes memory addresses for the write-enabled memory unit using the write enable and addresses from address generator 716. In step 822, the incoming data from IDCT 216 is written to the write-enabled memory unit in EMEM 350.

Figure 9:
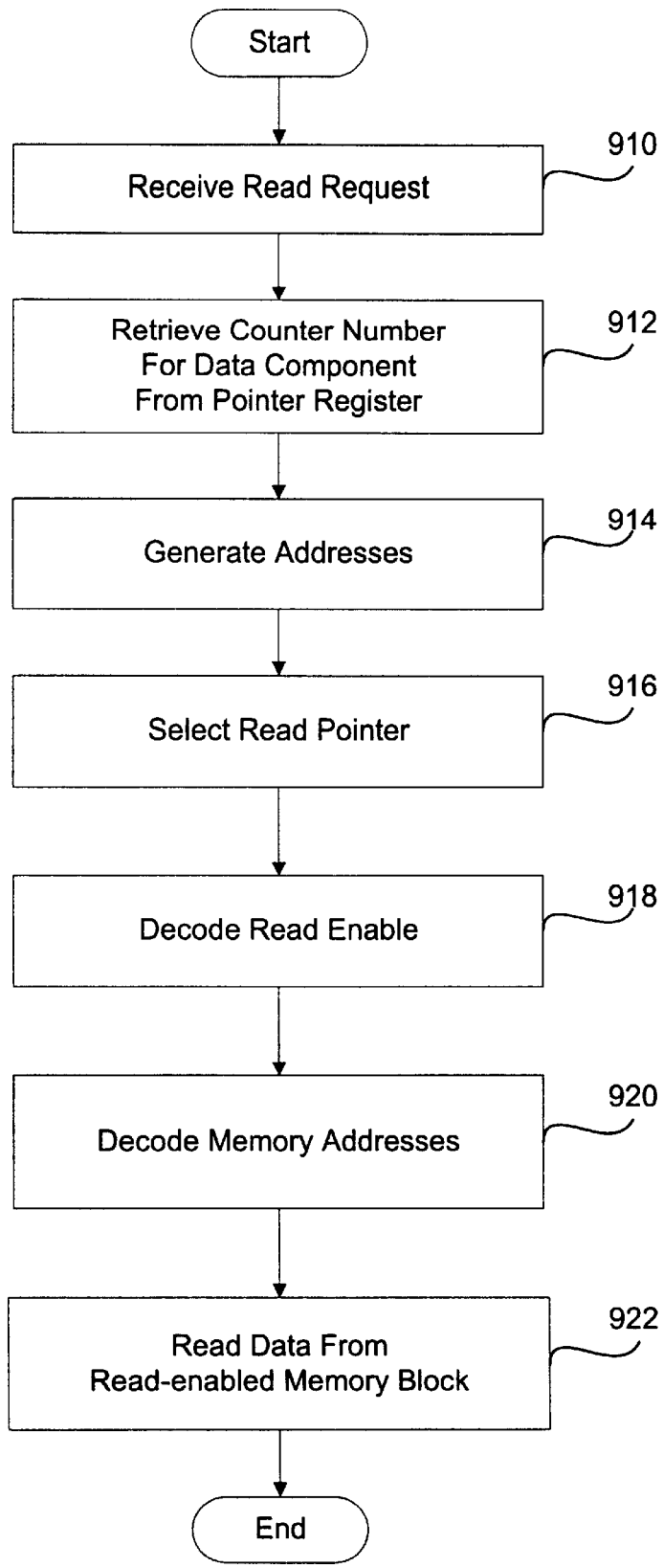
FIG. 9 is a flowchart of method steps for reading data from a memory unit, according to one embodiment of the present invention.

Referring now to FIG. 9, a flowchart of method steps for reading data from a memory unit is shown, according to one embodiment of the present invention. The method steps of FIG. 9 are preferably performed using the embodiment of EMEM 350 and EMEM interface 352 described above in conjunction with FIG. 7. Initially, in step 910, read pointer decoder 714 receives a read signal from MC main control 320 indicating the data component to be read. In step 912, read pointer decoder 714 retrieves a counter value for the selected data component from pointer register 712.

In step 914, address generator 716 receives a read index signal from MC main control 320 indicating the data component to be read, and responsively generates addresses for the data component. In step 916, multiplexer 724 outputs the counter value or the counter value incremented by 1 as a read pointer, according to a select value from pointer selector 736. In step 918, decoder 734 decodes the read pointer to produce a read enable for the appropriate memory unit in EMEM 350. In step 920, address decoder 718 decodes memory addresses for the read-enabled memory unit using the read enable and addresses from address generator 716. In step 922, calculator 330 reads the output of the read-enabled memory unit.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. An apparatus for efficient memory utilization in an electronic system, comprising:
   a data source that generates first data components and second data components, said first data components and said second data components being of unequal size;
   a memory having memory units, said memory units being of equal size;
   an interface between said data source and said memory, which manages storing and retrieving said first data components and said second data components in said memory; and a control module that asserts a busy signal to said data source when a sufficient number of said memory units is not available, whereby said data source stops generating said first data components and said second data components, said control module de-asserting said busy signal to said data source when said sufficient number of said memory units becomes available, whereby said data source resumes generating said first data components and said second data components, said control module sending control signals to said interface to control read and write operations for said first data components and said second data components, said interface including an address generator that generates a set of addresses for each of said first data components and for each of said second data components in response to one of said control signals from said control module.

2. An apparatus for efficient memory utilization in an electronic system, comprising:

a data source that generates first data components and second data components, said first data components and said second data components being of unequal size;

a memory having memory units, said memory units being of equal size;

an interface between said data source and said memory, which manages storing and retrieving said first data components and said second data components in said memory; and a control module that asserts a busy signal to said data source when a sufficient number of said memory units is not available, whereby said data source stops generating said first data components and said second data components, said control module de-asserting said busy signal to said data source when said sufficient number of said memory units becomes available, whereby said data source resumes generating said first data components and said second data components, said control module sending control signals to said interface to control read and write operations for said first data components and said second data components, said interface generating a write enable in response to a write signal from said control module to sequentially enable each of said memory units to store said first data components and said second data components.

3. An apparatus for efficient memory utilization in an electronic system, comprising:

a data source that generates first data components and second data components, said first data components and said second data components being of unequal size;

a memory having memory units, said memory units being of equal size;

an interface between said data source and said memory, which manages storing and retrieving said first data components and said second data components in said memory; and a control module that asserts a busy signal to said data source when a sufficient number of said memory units is not available, whereby said data source stops generating said first data components and said second data components, said control module de-asserting said busy signal to said data source when said sufficient number of said memory units becomes available, whereby said data source resumes generating said first data components and said second data components, said control module sending control signals to said interface to control read and write operations for said first data components and said second data components, said interface generating a read enable in response to a read signal from said control module to sequentially enable each of said memory units to output said first data components and said second data components.

4. An apparatus for efficient memory utilization in an electronic system, comprising:

a data source that generates first data components and second data components, said first data components and said second data components being of unequal size, said first data components comprising luminance data components and said second data components comprising chrominance data components, each of said luminance data components being two times larger than each of said chrominance data components;

a memory having memory units, said memory units being of equal size, said electronic system comprising a video decoder system; and an interface between said data source and said memory, which manages storing and retrieving said first data components and said second data components in said memory, said interface managing storing said luminance data components and said chrominance data components by storing each of said luminance data components in two of said memory units and storing each of said chrominance data components in one of said memory units.

5. The apparatus of claim 4, wherein said memory is divided into five memory units and said memory is configured as a continuous memory ring.

6. The apparatus of claim 5, further comprising a control module that sends control signals to said interface to control read and write operations for said luminance data components and said chrominance data components.

7. The apparatus of claim 6, wherein said interface includes an address generator that generates a set of addresses for each of said luminance data components and for each of said chrominance data components in response to one of said control signals from said control module.

8. The apparatus of claim 7, wherein said interface generates a write enable in response to a write signal from said control module to sequentially enable said memory units to store said luminance data components and said chrominance data components, and generates a read enable in response to a read signal from said control module to sequentially enable said memory units to output said luminance data components and said chrominance data components.

9. The apparatus of claim 8, wherein said write enable is decoded from a write pointer that is selected according to a most significant bit of one of said set of addresses, and wherein said read enable is decoded from a read pointer that is selected according to said most significant bit of said one of said set of addresses.

10. A method for efficient utilization of a memory in an electronic system, comprising the steps of:

generating first data components and second data components using a data source, said first data components and said second data components being of unequal size;

dividing said memory into memory units, each of said memory units being of equal size;

asserting a busy signal from a control module to said data source when a sufficient number of said memory units is not available, whereby said data source stops generating said first data components and said second data components;

de-asserting said busy signal from said control module to said data source when said sufficient number of said memory units becomes available, whereby said data source resumes generating said first data components and said second data components; and managing storing and retrieving of said first data components and said second data components in said memory using an interface between said memory and said data source, said control module sending control signals to said interface to control read and write operations for said first data components and said second data components, said interface including an address generator that generates a set of addresses for each of said first data components and for each of said second data components in response to one of said control signals from said control module.

11. A method for efficient utilization of a memory in an electronic system, comprising the steps of:

generating first data components and second data components using a data source, said first data components and said second data components being of unequal size;

dividing said memory into memory units, each of said memory units being of equal size;

asserting a busy signal from a control module to said data source when a sufficient number of said memory units is not available, whereby said data source stops generating said first data components and said second data components;

de-asserting said busy signal from said control module to said data source when said sufficient number of said memory units becomes available, whereby said data source resumes generating said first data components and said second data components; and managing storing and retrieving of said first data components and said second data components in said memory using an interface between said memory and said data source, said control module sending control signals to said interface to control read and write operations for said first data components and said second data components, said interface generating a write enable in response to a write signal from said control module to sequentially enable each of said memory units to store said first data components and said second data components.

12. A method for efficient utilization of a memory in an electronic system, comprising the steps of:

generating first data components and second data components using a data source, said first data components and said second data components being of unequal size;

dividing said memory into memory units, each of said memory units being of equal size;

asserting a busy signal from a control module to said data source when a sufficient number of said memory units is not available, whereby said data source stops generating said first data components and said second data components;

de-asserting said busy signal from said control module to said data source when said sufficient number of said memory units becomes available, whereby said data source resumes generating said first data components and said second data components; and managing storing and retrieving of said first data components and said second data components in said memory using an interface between said memory and said data source, said control module sending control signals to said interface to control read and write operations for said first data components and said second data components, said interface generating a read enable in response to a read signal from said control module to sequentially enable each of said memory units to output said first data components and said second data components.

13. A method for efficient utilization of a memory in an electronic system, comprising the steps of:

generating first data components and second data components using a data source, said first data components and said second data components being of unequal size, said first data components comprising luminance data components and said second data components comprising chrominance data components, each of said luminance data components being two times larger than each of said chrominance data components;

dividing said memory into memory units, each of said memory units being of equal size, said electronic system comprising a video decoder system; and managing storing and retrieving of said first data components and said second data components in said memory using an interface between said memory and said data source, said interface managing storing said luminance data components and said chrominance data components by storing each of said luminance data components in two of said memory units and storing each of said chrominance data components in one of said memory units.

14. The method of claim 13, wherein said memory is divided into five memory units and said memory is configured as a continuous memory ring.

15. The method of claim 14, further comprising a control module that sends control signals to said interface to control read and write operations for said luminance data components and said chrominance data components.

16. The method of claim 15, wherein said interface includes an address generator that generates a set of addresses for each of said luminance data components and for each of said chrominance data components in response to one of said control signals from said control module.

17. The method of claim 16, wherein said interface generates a write enable in response to a write signal from said control module to sequentially enable said memory units to store said luminance data components and said chrominance data components, and generates a read enable in response to a read signal from said control module to sequentially enable said memory units to output said luminance data components and said chrominance data components.

18. The method of claim 17, wherein said write enable is decoded from a write pointer that is selected according to a most significant bit of one of said set of addresses, and wherein said read enable is decoded from a read pointer that is selected according to said most significant bit of said one of said set of addresses.

* * * * *